(12) United States Patent
Verduijn et al.

(10) Patent No.: US 6,350,428 B1
(45) Date of Patent: *Feb. 26, 2002

(54) PREPARATION OF ZEOLITE-BOUND FAU STRUCTURE TYPE ZEOLITE AND USE THEREOF

(75) Inventors: Johannes Petrus Verduijn, deceased, late of Leefdaal (BE); by Jannetje Maatje van den Berge, Oostvoorne (NL); Machteld Mertens, Muizen (BE)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,445

(22) Filed: May 29, 1998

Related U.S. Application Data

(60) Provisional application No. 60/050,419, filed on May 29, 1997.

(51) Int. Cl.[7] .......................... C01B 39/20; B01J 29/08; C10G 47/04; C10G 11/05; C10G 35/095
(52) U.S. Cl. ...................... 423/702; 423/706; 423/712; 423/716; 423/DIG. 21; 502/79; 208/111.01; 208/120.01; 208/134
(58) Field of Search .................. 423/706, 702, 423/712, 716, DIG. 21; 502/79; 208/111.01, 120.01, 134

(56) References Cited

U.S. PATENT DOCUMENTS

| | | | | |
|---|---|---|---|---|
| 3,356,450 A | * | 12/1967 | Heinze ....................... | 423/716 |
| 3,906,076 A | * | 9/1975 | Goytisolo et al. | |
| 4,113,843 A | * | 9/1978 | Mirsky et al. ........ | 423/DIG. 21 |
| 4,381,255 A | * | 4/1983 | Nozemack et al. | |
| 4,381,256 A | * | 4/1983 | Hildebrandt | |
| 5,026,531 A | * | 6/1991 | Tannous et al. .............. | 502/69 |
| 5,045,295 A | * | 9/1991 | Tannous et al. .............. | 502/69 |
| 5,098,686 A | | 3/1992 | Delprato et al. | |
| 5,098,894 A | | 3/1992 | Sakurada et al. | |
| 5,393,511 A | | 2/1995 | Delprato et al. | |

FOREIGN PATENT DOCUMENTS

| | | |
|---|---|---|
| EP | 0196043 | 10/1986 |
| EP | 0554922 | 8/1993 |
| EP | 0595703 | 5/1994 |
| GB | 2160517 | * 12/1985 |
| WO | 92/12928 | 8/1992 |
| WO | 96/16004 | * 5/1996 |
| WO | 97/45198 | * 12/1997 |
| WO | 97/45384 | * 12/1997 |

OTHER PUBLICATIONS

U.S. application No. 08/865,343, Verduijn et al., filed May 29, 1997.

T. Chatelain[a], J. Patarin, E. Brendle, F. Dougnier, J.L. Guth and P.Schulz, Studies in Surface Science and Catalysis, 1997, vol. 105, pp. 173–180. (No Month).

L. Schreveck, P. Caullet et J.C. Mougenel, Syntheses D'Aluminophosphates Microporeux en Presence de Diaza–Polyoxa–Macrocyclels. Role Co–Structurant Desions $F^-ET/OU$ $(CH_3)_4N^-$., Laboratoire de Materiaux. Mineraux, ENSCMu.. URA–CNRS–428, 3 rue A. Werner, 68093 (No Date Available).

F. Delprato: Synthesis of Silica Cubmic Faujasite and its Hexagonal Polytype Using New Templates of the Crown Ether Family: Zeolite for the Nineties. Presented during the 8th International Zeolite Conference, Amsterdam, Jul. 10–14, 1989, pp. 127–128, XP002078922.

Database Compendex Engineering Information, Inc., New York, NY, US Sandra L Burkett et al.: "Structure–Directing Effects in the Crown Ether–Mediated Syntheses of FAU and EMT Zeolites" See abstract & Microporous Mater; Microporous Materials Jul. 1993, vol. 1, No. 4, Jul. 1993, pp. 265–282.

\* cited by examiner

*Primary Examiner*—David R Sample
(74) *Attorney, Agent, or Firm*—Edward F. Sherer

(57) ABSTRACT

This invention relates to a process for producing zeolite-bound FAU structure type zeolite having excellent mechanical strength and containing reduced amounts of zeolite P and the use of the zeolite-bound FAU structure type zeolites produced by the process. The zeolite-bound FAU structure type zeolite is prepared by converting the silica of a silica-bound FAU structure type aggregate in an aqueous mixture containing an effective amount of crown ether, e.g., 15-crown-5 and 18-crown-6, to suppress the formation of zeolite P and sufficient hydroxy ions to cause the silica to be converted to the zeolite. The zeolite-bound FAU structure type zeolite finds particular application in adsorption processes and hydrocarbon conversion processes such as catalytic cracking, hydrocracking, and reforming.

62 Claims, 6 Drawing Sheets

PREPARATION OF ZEOLITE-BOUND FAU STRUCTURE TYPE ZEOLITE AND USE THEREOF

This application claims the benefit of Provisional Application No. 60/050,419, filed May 29, 1997.

FIELD OF THE INVENTION

The present invention relates to a process for preparing zeolite-bound FAU structure type zeolites containing reduced amounts of zeolite P and with good mechanical strength and the use of the zeolite-bound FAU structure type zeolite as prepared by the process as an adsorbent or as a catalyst in hydrocarbon conversion.

BACKGROUND OF THE INVENTION

Crystalline microporous molecular sieves, both natural and synthetic, have been demonstrated to have catalytic properties for various types of hydrocarbon conversion processes. In addition, the crystalline microporous molecular sieves have been used as adsorbents and catalyst carriers for various types of hydrocarbon conversion processes, and other applications. These molecular sieves are ordered, porous, crystalline material having a definite crystalline structure as determined by x-ray diffraction, within which there are a large number of smaller cavities which may be interconnected by a number of still smaller channels or pores. The dimensions of these channels or pores are such as to allow for adsorption of molecules with certain dimensions while rejecting those of large dimensions. The interstitial spaces or channels formed by the crystalline network enable molecular sieves such as crystalline silicates, crystalline aluminosilicates crystalline silicoalumino phosphates, and crystalline aluminophosphates, to be used as molecular sieves in separation processes and catalysts and catalyst supports in a wide variety of hydrocarbon conversion processes.

Zeolites are comprised of a lattice of silica and optionally alumina combined with exchangeable actions such as alkali or alkaline earth metal ions. Although the term "zeolites" includes materials containing silica and optionally alumina, it is recognized that the silica and alumina portions may be replaced in whole or in part with other oxides. For example, germanium oxide, tin oxide, phosphorous oxide, and mixtures thereof can replace the silica portion. Boron oxide, iron oxide, gallium oxide, indium oxide, and mixtures thereof can replace the alumina portion. Accordingly, the terms "zeolite", "zeolites" and "zeolite material", as used herein, shall mean not only materials containing silicon and, optionally, aluminum atoms in the crystalline lattice structure thereof, but also materials which contain suitable replacement atoms for such silicon and aluminum, such as gallosilicates, silicoaluminophosphates (SAPO) and aluminophosphates (ALPO). The term "aluminosilicate zeolite", as used herein, shall mean zeolite materials consisting essentially of silicon and aluminum atoms in the crystalline lattice structure thereof.

Zeolites having a FAU structure type can be employed in adsorption and also as catalysts in the conversion of organic compounds such as hydrocarbons. The details of the structure of these zeolites as well as their isostructures are provided in "Atlas of Zeolite Structure Types", eds. W. H. Meier, D. H. Olson and Ch. Baerlocher, Elsevier, Fourth Edition, 1996, which is hereby incorporated by reference. Meier et al. indicates that FAU structure type zeolites are formed by 12-ring structures and have channels of about 7.4 Å. Examples of such zeolites include faujasite, zeolite X, zeolite Y, LZ-210, SAPO-37, zincophosphate X, beryllophosphate X. Other isotopic framework structures include EMT-FAU structure intermediates such as CSZ-1, ECR-30, ZSM-3, and ZSM-20.

Synthetic zeolites, including FAU structure type zeolites, are normally prepared by crystallization of zeolites from a supersaturated synthesis mixture. The resulting crystalline product is then dried and calcined to produce a zeolite powder. Although the zeolite powder has good adsorptive properties, its practical applications are severely limited because it is difficult to operate fixed beds with zeolite powder. Therefore, prior to using the powder in commercial processes, the zeolite crystals are usually bound.

The zeolite powder is typically bound by forming a zeolite aggregate such as a pill, sphere, or extrudate. Extruding the zeolite in the presence of a non-zeolitic binder and drying and calcining the resulting extrudate usually forms the extrudate. The binder materials used are resistant to the temperatures and other conditions, e.g., mechanical attrition, which occur in various hydrocarbon conversion processes. Examples of binder materials include amorphous materials such as alumina, silica, titania, and various types of clays. It is generally necessary that the zeolite be resistant to mechanical attrition, that is, the formation of fines, which are small particles, e.g., particles having a size of less than 20 microns.

Although such bound zeolite aggregates have much better mechanical strength than the zeolite powder, when such a bound zeolite is used for hydrocarbon conversion, the performance of the zeolite catalyst, e.g., activity, selectivity, activity maintenance, or combinations thereof, can be reduced because of the binder. For instance, since the binder is typically present in an amount of up to about 50 wt. % of zeolite, the binder dilutes the adsorption properties of the zeolite aggregate. In addition, since the bound zeolite is prepared by extruding or otherwise forming the zeolite with the binder and subsequently drying and calcining the extrudate, the amorphous binder can penetrate the pores of the zeolite or otherwise block access to the pores of the zeolite, or slow the rate of mass transfer to the pores of the zeolite which can reduce the effectiveness of the zeolite when used in hydrocarbon conversion. Furthermore, when the bound zeolite is used in hydrocarbon conversion, the binder may affect the chemical reactions that are taking place within the zeolite and also may it catalyze undesirable reactions, which can result in the formation of undesirable products.

One procedure for making zeolite-bound zeolites involves converting the silica present of silica-bound aggregates containing zeolite core crystals to a zeolite binder by aging the silica-bound aggregates in an aqueous alkaline solution. The contents of the solution and the temperature at which the aggregates are aged are selected to convert the silica binder to the desired zeolite binder. When such a procedure is used to prepare zeolite-bound FAU structure type zeolite, certain problems can arise. For instance, it is sometimes difficult to convert the silica binder to the desired zeolite binder without also forming unwanted zeolite P. If aging conditions are selected to reduce the formation of zeolite P, the resulting zeolite-bound FAU structure type zeolite may have reduced mechanical strength, which is not desirable if the zeolite-bound FAU structure type zeolite is used in commercial applications.

Thus, the combined objective of producing zeolite-bound FAU structure type zeolite containing reduced amounts of zeolite P and good mechanical strength is somewhat irreconcilable using these procedures.

SUMMARY OF THE INVENTION

In accordance with the present invention, there is provided a process for producing zeolite-bound FAU structure type zeolites containing reduced amounts of zeolite P and having good mechanical strength. The process is carried out by converting the silica binder of a silica-bound aggregate containing FAU structure type zeolite in an aqueous mixture comprising an effective amount of crown ether to reduce the formation of unwanted zeolite P and sufficient hydroxy ions to cause the silica binder to be converted to the zeolite binder.

In another embodiment, the present invention provides a hydrocarbon conversion process for converting organic compounds by contacting the organic compounds under hydrocarbon conversion conditions with the zeolite-bound FAU structure type zeolite synthesized by the process. Examples of such processes include reactions such as catalytic cracking, hydrocracking, and reforming. The zeolite-bound FAU structure type zeolite as synthesized by the process can also be employed as adsorbents for performing the selective adsorption of molecules.

DETAILED DESCRIPTION OF THE INVENTION

Figure 1:
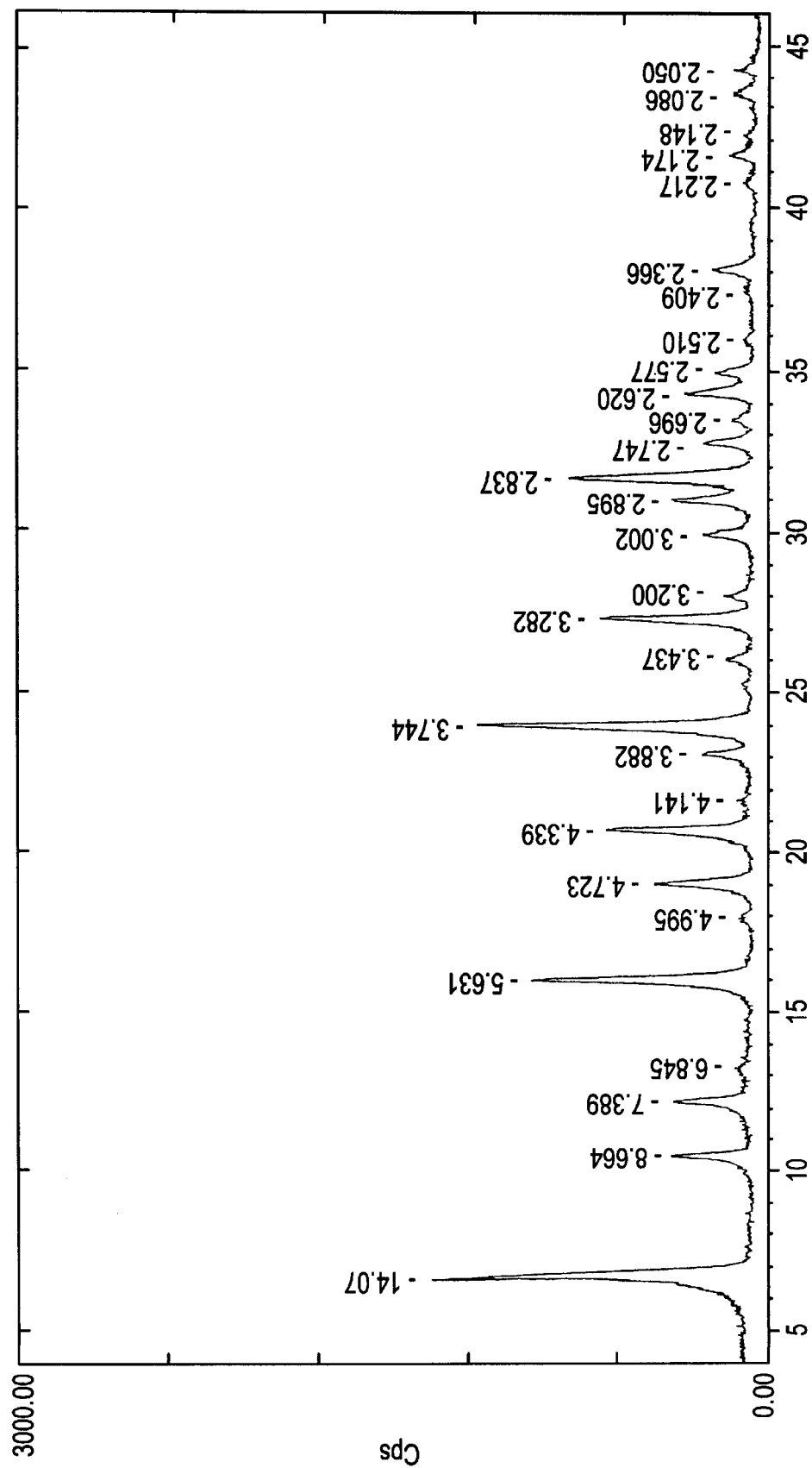
FIG. 1 is a x-ray diffractogram of the calcined product of Example 1.

The process for preparing the zeolite-bound FAU structure type zeolite preferably comprises the following steps:

(a) Forming an extrudable mass comprising FAU structure type zeolite crystals, silica, water, and optionally an extrusion aid;

(b) Extruding the extrudable mass to form silica-bound zeolite aggregates containing the FAU structure type zeolite crystals;

(c) Introducing an effective amount of crown ether to suppress the formation of zeolite P into an aqueous ionic solution containing the silica-bound zeolite aggregates and sufficient hydroxy ions to cause the silica binder to be converted to the zeolite binder crystals; and, (d) Converting the silica binder of said silica-bound aggregate to the zeolite binder.

The zeolite-bound FAU structure type zeolite will comprise FAU structure zeolite crystals that are bound together by zeolite binder crystals. The zeolite-bound FAU structure type zeolite generally will not contain significant amounts of non-zeolitic binder and the binder will preferably be substantially free of zeolite P.

The expression "crown ether", as used herein, means carbon-containing macrocyclic and polymacrocyclic compounds with the ring of the compounds containing from about 10 to about 24 carbon atoms and having at least 4 heteroatoms such as oxygen, nitrogen, silicon, sulfur, or combinations thereof. The ring of the crown ether will usually contain from about 12 to about 20 carbon atoms and have from about 4 to about 6 heteroatoms with the heteroatoms being oxygen.

Crown ethers suitable for use in the process include macrocyclic compounds represented by the following formula:

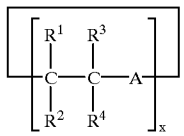

wherein:

A is a diradical such as —O—, —S—, —NH—, —NR—, or —SiR$_2$—;

R is an alkyl group having from 1 to about 5 carbon atoms;

R$^1$, R$^2$, R$^3$, and R$^4$ are each independently selected from the group consisting of hydrogen and alkyl groups including straight chain, branched, and cyclic alkyl groups, containing from 1 to about 10 carbon atoms or R$^1$ through R$^4$ together can form cycloalkyl, aryl, aralkyl, or alkaryl groups, and the ring can be substituted with alkyl, alkenyl, or alkynyl groups containing from 1 to about 12 carbon atoms; and x is an integer of at least about 4.

Examples of R include methyl, ethyl, propyl, isopropyl, butyl, sec-butyl, isobutyl, and tetra-butyl.

Examples of R$^1$, R$^2$, R$^3$, and R$^4$ include hydrogen and alkyl groups such as methyl, ethyl, propyl, isopropyl, butyl, sec-butyl, isobutyl, tetra-butyl, pentyl, isopentyl, isohexyl, 3-methylpentyl, 2,3-dimethylbutyl, heptyl, octyl, nonyl, decyl, undecyl, dodecyl, tetradecyl, hexadecyl, octadecyl, cyclopentyl, cyclohexyl and the like. Preferably, at least two (2) of the R$^1$, R$^2$, R$^3$, and R$^4$ groups are hydrogen.

Examples of crown ethers containing only oxygen heteroatoms include the following compounds:

1,4,7,10-tetraoxacyclododecane (12-crown-4);
1,4,7,10,13-pentaoxacyclopentadecane (15-crown-5);
1,4,7,10,13,16-hexaoxacyclooctadecane (18-crown-6);
2,3,11,12-dibenzo-1,4,7,10,13,16-hexaoxacyclooctadecane (dibenzo-18-crown-6);
2,3,11,12-dicyclohexano-1,4,7,10,13,16-hexaoxacycloocadecane (dicyclohexano-18-crown-6);
2,3,14,15-dibenzo-1,4,7,13,16,19,22-oxaoxacyclotetracosane (dibenzo-24-crown-8);
2,3,14,15-dicyclohexano-1,4,7,10,13,16,19,22-oxtaoxacycloteracosane (dicyclohexano-24-crown-8); and
2,3-benzo-1,4,7,10,13-pentaoxacyclopentadecane (benzo-15-crown-5).

Examples of crown ethers in which the oxygen heteroatoms in the ring are partially or completely replaced by sulfur, nitrogen, or silicon atoms include the following compounds:

1,4,7,10-tetrazaacyclododecane;
1,4,10-trioxa-7,13-diazacyclopentadecane
1,4,10,13-tetraoxa-7,16-diazacycloctadecane;

1,4,8,11-tetraazacyclotetradecane;
1,4,8,12,-tetraazacyclopentadecane;
1,4,8,11-tetraazacyclotridecane;
1,4,7,10,13,16-hexaazacyclooctadecane trisulphate;
14-(1,1-dimethylsila)-1,4,7,10,13-pentaoxacyclotetradecane(dimethylsila-14-crown-5);
11-(1,1-dimethylsila)-1,4,7,10-tetraoxacycloundecane (dimethylsila-11-crown-4);
17-(1-1-dimethylsila)-1,4,7,10,13,16-hexaoxacycloheptadecane(dimethylsila-17-crown-6);
20-(1,1-dimethylsila)-1,4,7,10,3,16,19-heptaoxacycloeicosane(dimethylsila-20-crown-7);
1,4,7,10,13,16-hexathiacyclooctadecane;
17-(1-methyl-1-vinylsila)-1,4,7,10,13,16-hexaoxacycloheptadecane(methylvinylsila-17-crown-6);
14-(1-methyl-1-vinylsila)-1,4,7,10,13,pentaoxacyclotetradecane(methylcinylsila-14-crown-5);
1,7,10,16-tetraoxa-4,13-diazacyclooctadecane (Kryptofix 22); and
1,7,10-trioxa-4,13-diazacyclopentadecane (Kryptofix 2.1).

Examples of polymacrocyclic compounds include the following compounds:

4,7,13,16,21-pentaoxa-1,10-diazabicyclo[8.5.5]tricosane;
5,6-benzo-4,17,13,16,21,24-hexaoxa-1,10-diazabicyclo [8.8.8]hexacosane; and
4,7,13,16,21,24-hexaoxa-1,10-diazabicyclo[8.8.8] hexacosane.

The amount of crown ether present in the aqueous alkaline mixture to suppress the formation of unwanted zeolite P will vary. Generally the amount of crown ether present will be a molar ratio of crown ether to $SiO_2$ in the range of from about 0.01 to about 2.00. The preferred amount of crown ether to $SiO_2$ present in the aqueous alkaline mixture will be a molar ratio of from about 0.01 to about 1.00.

Zeolite P is more easily formed if low alkalinity gel compositions are used to convert the silica binder to the zeolite binder. Because it is advantageous for the zeolite P content of the product to be minimized, the amount of hydroxy ions present in the aqueous ionic mixture will preferably be a molar ratio of $(OH^-):(SiO_2)$ in the range of from about 0.025 to about 0.64, and more preferably from about 0.10 to about 0.55.

The zeolite P content of the zeolite-bound FAU structure type zeolite can be monitored by its x-ray diffraction pattern. The more significant of values for zeolite P are given in Table I below:

TABLE I

| d value for zeolite P |
| --- |
| 7.11 ± 0.1 |
| 5.02 ± 0.1 |
| 4.10 ± 0.1 |
| 3.18 ± 0.1 |

The zeolite-bound FAU structure type zeolite will contain reduced amounts of zeolite P. The expression "reduced amounts of zeolite P", as used herein, means that the zeolite-bound FAU structure type zeolite formed by the process of the present invention will contain less zeolite P than zeolite-bound FAU structure type zeolite formed from an aqueous mixture having the same initial composition except for the absence of crown ether, and under the same conditions. Preferably, the binder zeolite of the zeolite-bound FAU structure type zeolite is substantially free of zeolite P. Most preferably, the binder zeolite of the zeolite-bound FAU structure type zeolite is substantially free of zeolite P as evidenced by an absence of the XRD pattern of a line at a d spacing of 3.18±0.1 Å. It is a surprising feature of the present invention that zeolite-bound FAU structure type zeolite substantially free of zeolite P may be obtained by the process of the present invention.

The silica binder used in preparing the silica-bound zeolite aggregate may be commercially available silica. Preferably, the silica does not contain significant amounts, and preferably no more than 2000 ppm, of alumina.

The FAU structure type zeolite present in the silica-bound FAU structure type zeolite (core crystals) can be prepared using procedures known to persons skilled in the art. For example, the preparation of zeolite X is described in U.S. Pat. No. 2,882,244 and the preparation of zeolite Y are described in U.S. Pat. No. 3,130,007. The general process for the synthesis of FAU structure type zeolite involves the hydrothermal crystallization of a zeolite synthesis mixture of specific sip composition. The composition of the zeolite can be aluminosilicate, iron silicate, titanosilicate, borosilicate, gallosilicate, or aluminophosphate substituted by a metal or silicon. In addition, other materials can be used in the crystalline-lattice structure of the zeolite. The resulting product is washed, dried, and optionally calcined to produce zeolite powder.

Zeolite aggregates can be prepared by mixing the zeolite powder with water, a silica sol, and optionally an extrusion aid to form a thick, smooth paste. The paste is then extruded to form silica-bound extrudates, which are dried and calcined. Alternatively, the zeolite aggregates can be formed by spray drying, pilling, etc.

During the aging, the amorphous silica surrounding the matrix FAU structure type zeolite crystals is converted into zeolite crystals. The newly formed zeolite also may be produced as crystals grown on and surrounding the initial binder crystals, and may also be produced in the form of new intergrown crystals, which are generally much smaller than the matrix crystals e.g., of sub-micron size. The binder crystals may grow to be joined together, or may become joined together by the smaller intergrown crystals, which seem to act as glue.

When carrying out the process of the present invention the zeolite extrudate is usually aged at an elevated temperature. A suitable aging temperature may range from 95° to 200° C. depending on the binder crystals to be formed.

The time during which the extrudate may be aged will depend on the binder zeolite being prepared, but may be for example, from 20 to 140 hours. Zeolites, such as zeolite Y as binder zeolite, generally require less time, e.g., 18 to 40 hours, preferably 18 to 28 hours, but the time also depends on the $(OH^-):(SiO_2)$ ratio of the synthesis mixture. In a preferred embodiment, the aqueous ionic mixture in which the bound aggregate is aged will contain reduced amounts of hydroxy ions as higher amounts of hydroxide ions promote the formation of unwanted zeolite P and other impurities. The amount of hydroxy ions present in present in the aqueous ionic mixture will preferably be a molar ratio of $(OH^-):(SiO_2)$ in the range of from about 0.025 to about 0.64, and more preferably from about 0.10 to about 0.55.

The binder zeolite will usually be a FAU or EMT structure type zeolite. EMT structure type zeolites include EMC-2. FAU structure type zeolites include faujasite, zeolite X, zeolite Y, LZ-210, SAPO-37, zincophosphate X, beryllophosphate X. FAU structure type zeolite also include EMT-FAU structure intermediates such as CSZ-1, ECR-30, ZSM-3, and ZSM-20.

The composition of the zeolite binder can be aluminosilicate, iron silicate, titanosilicate, borosilicate, gallosilicate, or aluminophosphate substituted by a metal or silicon. In addition, other materials can be used in the crystalline-lattice structure of the binder zeolite. The zeolite binder can have the same acidity, higher acidity, or lower acidity than the FAU structure type zeolite crystals of the silica-bound aggregate.

The zeolite-bound FAU structure type zeolite generally will not contain significant amounts of non-zeolite binder, e.g., the zeolite-bound FAU structure type zeolite produced by the process of the present invention usually will contain less than 10 percent by weight, based on the weight of the zeolites, of non-zeolitic binder, more preferably will contain less than 5 percent by weight, and, most preferably, the catalyst will be substantially free of non-zeolitic binder. The binding crystals can bind the core crystals by adhering to the surface of the core crystals thereby forming a matrix or bridge structure, which also holds the core crystals together. The zeolite binder can bind the core crystals by intergrowing so as to form a coating or partial coating on the larger core crystals. Preferably, the zeolite binding crystals bind the core crystals by intergrowing to form an attrition resistant overgrowth over the core crystals.

The zeolite-bound FAU structure type zeolite is preferably prepared by a three-step procedure. The first step involves the synthesis of the FAU structure type zeolite core crystals.

In the second step, a silica-bound FAU structure type zeoliteis prepared by mixing a mixture comprising the FAU structure type core crystals, a silica gel or sol, water, and optionally an extrusion aid, until a homogeneous composition in the form of an extrudable paste develops. The silica binder used in preparing the silica bound zeolite aggregate is preferably a silica sol and can contain various amounts of trivalent elements, e.g., aluminum, gallium, etc. The amount of silica used will usually be such that the content of the zeolite in the dried extrudate at this stage will range from about 40 to 90% by weight, more preferably from about 50 to 80% by weight, with the balance being primarily silica, e.g. about 20 to 50% by weight silica.

The resulting paste is then molded, e.g., extruded, and cut into small strands, e.g., approximately 2 mm diameter extrudates, which are dried at 100° C. to 150° C. for a period of 4–12 hours and then are calcined in air at a temperature of from about 400° C. to 550° C. for a period of from about 1 to 10 hours.

Optionally, the silica-bound aggregate can be made into very small particles, which have application in fluid bed processes such as catalytic cracking. This preferably involves mixing the FAU structure type zeolite with silica so that an aqueous solution of FAU structure type zeolite and silica is formed which can be sprayed dried to result in small fluidizible silica-bound aggregate particles. Procedures for preparing such aggregate particles are known to persons skilled in the art. An example of such a procedure is described by Scherzer (Octane-Enhancing Zeolitic FCC Catalysts, Julius Scherzer, Marcel Dekker, Inc. New York, 1990). The fluidizible silica-bound aggregate particles, like the silica bound extrudates described above, would then undergo the final step described below to convert the silica binder to the zeolite binder.

The final step in the three-step preparation process is the conversion of the silica present in the silica-bound FAU structure type zeolite to the zeolite binder, which binds the zeolite core crystals together.

The procedure for converting the silica in the silica-bound aggregate to the binder zeolite is to age the silica-bound aggregate in an aqueous synthetic mixture comprising an effective amount of crown either and having sufficient hydroxy ions to cause the silica binder to be converted to the zeolite binder crystals. The suitable aging temperature may range from 95 to 200° C., e.g., 95° to 110° C., for 20 to 140 hours.

The term "average particle size" as used herein means the arithmetic average of the diameter distribution of the crystals on a volume basis.

The average particle size of the core crystals will usually be from about 0.1 to about 15 microns. In some applications, the average particle size of the core crystals is from 1 to about 6 microns.

The binder crystals will usually have a smaller size than the core crystals and will preferably have an average particle size of less than 1 micron, for example, from about 0.1 to about 0.5 micron. The binder zeolite crystals bind the FAU structure type zeolite crystals and preferably intergrow and form an over-growth which coats or partially coats the FAU structure type zeolite. Preferably, the coating is resistant to attrition.

The binder is usually present in the zeolite-bound FAU structure type zeolite in an amount in the range of from about 10 to about 60% by weight based on the weight of the FAU structure type zeolite and, more preferably from about 20 to about 50% by weight.

The zeolite-bound FAU structure type zeolite may be further ion exchanged as is known in the art either to replace at least in part the metals present in the zeolite with a different cation, e.g. a metal from Group IB to VIII of the Periodic Table or to provide a more acidic form of the zeolite. Particularly preferred cations are those which render the material catalytically active, especially for certain hydrocarbon conversion reactions. These include hydrogen, rare earth metals, and one or more metals of Groups IIA, IIIA, IVA, VA, VIA, VIIA, VIII, IB, IIB, IIIB, IVB, and VB of the Periodic Table of the Elements. Examples of suitable metals include Group VIII metals (i.e., Pt. Pd, Ir, Rh, Os, Ru, Ni, Co and Fe), Group IVA metals (i.e., Sn and Pb), Group VA metals (i.e., Sb and Bi), and Group VIIB metals (i.e., Mn, Tc and Re). Noble metals (i.e., Pt, Pd, Ir, Rh, Os and Ru) are sometimes preferred.

The zeolite-bound FAU structure type zeolite can be used in processing hydrocarbon feedstock. Hydrocarbon feedstocks contain carbon compounds and can be from many different sources, such as virgin petroleum fractions, recycle petroleum fractions, tar sand oil, and, in general, can be any carbon containing fluid susceptible to zeolitic catalytic reactions. Depending on the type of processing the hydrocarbon feed is to undergo; the feed can contain metal or can be free of metals. Also, the feed can also have high or low nitrogen or sulfur impurities.

The conversion of hydrocarbon feeds can take place in any convenient mode, for example, in fluidized bed, moving bed, or fixed bed reactors depending on the types of process desired.

The zeolite-bound FAU structure type zeolite by itself or in combination with one or more catalytically active substances can be used as a catalyst or support for a variety of organic, e.g., hydrocarbon compound, conversion processes including catalytic cracking and reforming processes as well as hydrocarbon adsorption processes.

The catalysts have good cracking and hydrocracking activity and may be used to convert paraffin from high to low molecular weight substances in dewaxing processes. The term dewaxing means the removal of those hydrocarbons which will readily solidify (waxes) from petroleum stocks.

Hydrocarbon feeds, which can be treated, include lubricating oil stocks as well as those, which have a freeze point or pour point problem, e.g., petroleum stocks boiling above 350° F. The dewaxing can be carried out at either cracking or hydrocracking conditions.

Typical cracking conditions include a liquid hourly space velocity (LHSV) between about 0.5 and 200, a temperature between about 288° C. and 590° C., a pressure between about subatmospheric and several hundred atmospheres over the zeolite-bound FAU structure type zeolite catalyst. Typical hydrocracking conditions include a liquid hourly space velocity between about 0.1 and 10, a temperature between about 340° C. and 538° C., a pressure between about 100 (689 kPa) and 3000 psig (20.7 mPa), and a hydrogen to hydrocarbon mole ratio between about one and 20.

The zeolite-bound FAU structure type zeolite catalysts have particular application in reactions involving aromatization and/or dehydrogenation. They are particularly useful in a process for the dehydrocyclization and/or isomerization of acyclic hydrocarbons in which the hydrocarbons are contacted at a temperature of from 370° C. to 600° C., preferably from 430° C. to 550° C. with the zeolite-bound FAU structure type zeolite catalyst, preferably zeolite X or Y bound by zeolite X or Y, preferably having at least 90% of the exchangeable cations as alkali metal ions and incorporating at least one Group VIII metal having dehydrogenating activity, so as to convert at least part of the acyclic hydrocarbons into aromatic hydrocarbons.

In general, therefore, catalytic conversion conditions over a catalyst comprising the zeolite-bound FAU structure type zeolite include a temperature of from about 100° C. to about 760° C., a pressure of from about 0.1 atmosphere (bar) to about 200 atmospheres (bar) (10.1 kPa to 10.1 mPa), a weight hourly space velocity of from about 0.08 $hr^{-1}$ to about 2000 $hr^{-1}$ and a hydrogen/organic, e.g., hydrocarbon compound of from 0 to about 100.

The zeolite-bound FAU structure type zeolite can be used for selectively separating hydrocarbons having a critical dimension less than the pore size of the FAU structure type zeolite. Examples of such hydrocarbon separation include xylene isomer separation and separating olefins from a feed stream containing olefins and paraffins.

The adsorption process involves contacting a mixture, existing either as a gas, liquid or mixed phase with the zeolite-bound FAU structure type zeolite for a period of time to selectively adsorb a preferred compound within the internal pore structure of the FAU structure type zeolite. The components of the mixture that are not adsorbed are thus carried off. The compound sorbed is thereafter recovered from the internal pore structure of the zeolite by conventional desorbing techniques.

The temperature will usually be maintained below 150° C. when an acidic zeolite is used. When a non-acidic zeolite is used, then higher temperatures such as up to 400° C. may be used.

The temperature at which the adsorption process is conducted is not considered critical, so long as it is maintained below that required for chemical reaction to occur, e.g., below the cracking temperature. Preferably, the process is conducted at a temperature between ambient and about 150° C.

The following examples illustrate the invention.

EXAMPLE 1

Preparation of Zeolite Y Bound by Zeolite Y using 15-crown-5.

Zeolite Y crystals were formed into silica-bound zeolite Y as follows:

| Components Used for Preparation | Quantity, (Grams) | Component No. |
|---|---|---|
| Zeolite Y Crystals | 200.00 | 1 |
| Water | 133.39 | 2 |
| $SiO_2$ gel (Ketjensil SM 604) | 20.93 | 3 |
| Silica sol (NALCOAG 1034 A) | 197.74 | 4 |
| Methocel | 1.12 | 5 |

Components 1 and 2 were mixed in the bowl of a household mixer. Next, components 3 and 4 were added to the bowl and the contents were mixed. Component 5 was then added to the bowl and the mixing continued. Total mixing time was about 24 minutes. A plastic extrudable dough was obtained. The dough was extruded into 2-mm extrudates. The extrudates were dried overnight at 150° C. and then calcined for 7.5 hours at 525° C. The extrudates contained 30.09-weight percent silica.

The silica-bound zeolite Y extrudates were converted into zeolite Y bound by zeolite Y as follows:

| Ingredient | Supplier | Quantity, gr. | Component # |
|---|---|---|---|
| NaOH (98.6%) | Baker | 2.81 | 1 |
| Al(OH)$_3$ (98.5%) | AlCOA | 2.37 | 2 |
| $H_2O$ | | 8.06 | 3 |
| Rinse water | | 14.04 | 4 |
| 15-crown-5 | Aldrich | 2.55 | 5 |
| $H_2O$ | | 17.03 | 6 |
| Additional $H_2O$ | | 8.86 | 7 |
| Silica bound Y as prepared above | | 30.00 | 8 |

Components 1 and 2 were dissolved into component 3 by boiling to form a solution. In a 100 ml. plastic bottle, component 5 was dissolved into component 6. Component 7 was added to the contents of the plastic bottle. The solution, which contained components 1, 2, and 3, was added together with component 4 into the plastic bottle, which contained components 5, 6, and 7. The bottle was mixed to ensure a homogeneous mixture. Finally component 8 was then added to the bottle. The molar composition of the synthesis mixture was:

$$2.34Na_2O/0.77C.E\ 15\text{-}5/Al_2O_3/10SiO_2/183H_2O$$

The plastic bottle was connected to a condenser and placed into a 98° C. oil bath. After 9 days of heating at that temperature, crystallization was stopped. The product extrudates were washed 5 times with 1400 ml of water at 60° C. The conductivity of the last wash water was 47 µS/cm. The product was dried overnight at 120° C. Next, the extrudates were calcined at 500° C. for 9 hours. The amount of product recovered after calcination was 28.5 gr.

The product extrudates were characterized by x-ray diffraction (XRD), scanning electron microscopy (SEM) and hexane adsorption with the following results:

| | |
|---|---|
| XRD 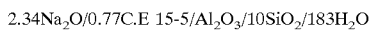 | FIG. 1 shows that the product had a FAU structure type and excellent crystallinity. No amorphous halo could be seen. Zeolite P was completely absent. |

-continued

Figure 2:
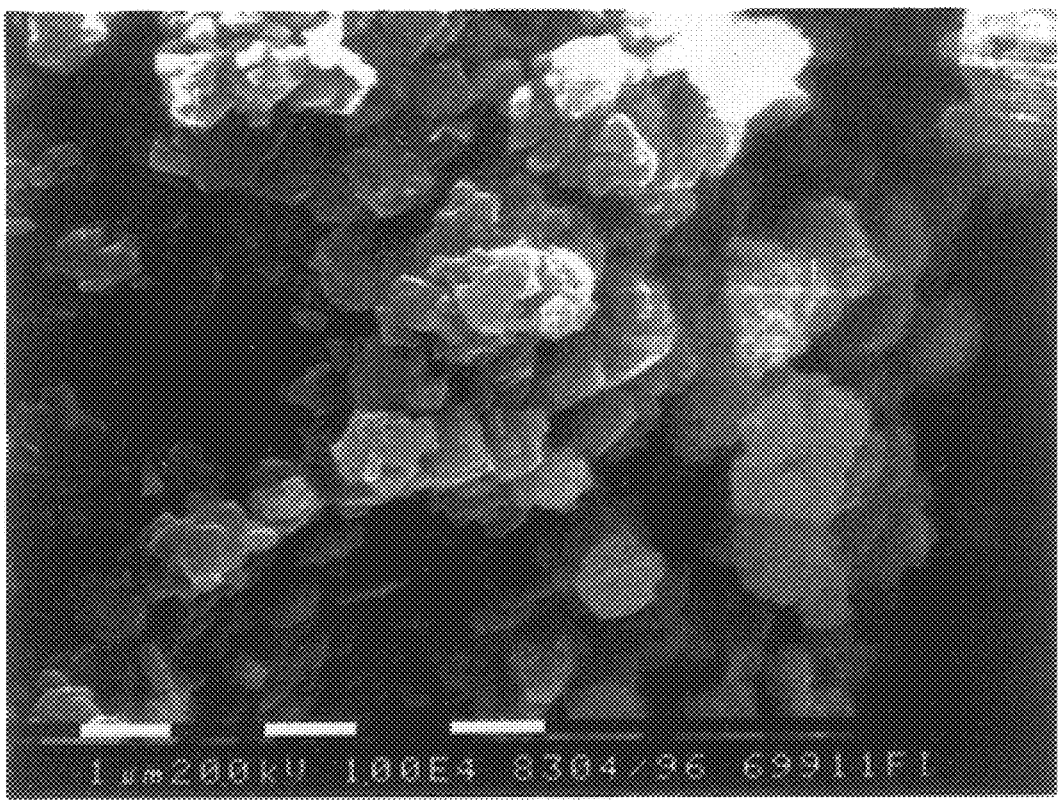
FIG. 2 is a SEM micrograph (40,000 times magnification) of the calcined product of Example 1.

| | |
|---|---|
| SEM | FIG. 2 shows that the zeolite Y core crystals were coated and glued together with newly formed crystals. No amorphous silica could be detected. |
| Elemental | Extrudate: $SiO_2$:$Al_2O_3$ = 4.9 |
| TGA | Hexane absorption = 17.95 wt. % |

EXAMPLE 2

Preparation of Zeolite Y Bound by EMT Structure Type Zeolite using 18-crown-6.

A portion of the silica-bound zeolite Y extrudates as prepared in Example 1 were converted into Zeolite Y bound by EMT structure type zeolite as follows:

| Components Used for Preparation | Quantity, (Grams) | Component No. |
|---|---|---|
| NaOH (98.6%) | 3.00 | 1 |
| Al(OH)$_3$ (98.5%) | 2.53 | 2 |
| Water | 8.64 | 3 |
| Rinse Water | 14.93 | 4 |
| 18-crown-6 | 3.25 | 5 |
| Water | 18.17 | 6 |
| Water | 9.45 | 7 |
| Silica Bound Zeolite Y | 32.0 | 8 |

Components 1 and 2 were dissolved into component 3 by boiling to form a solution. In a 100 ml. plastic bottle, component 5 was dissolved into component 6. Component 7 was added to the contents of the plastic bottle. The solution, which contained components 1, 2, and 3, was added together with component 4 into the plastic bottle. The bottle was mixed to ensure a homogeneous mixture. Finally component 8 was then added to the bottle. The molar composition of the synthesis mixture was:

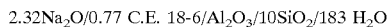

2.32Na$_2$O/0.77 C.E. 18-6/Al$_2$O$_3$/10SiO$_2$/183 H$_2$O

The plastic bottle was connected to a condenser and placed into a 98° C. oil bath. After 15 days of heating at that temperature, crystallization was stopped. The product extrudates were washed 5 times with 800-ml water at 60° C. The conductivity of the last wash water was 70 µS/cm. The product was dried overnight at 120° C. Next, the extrudates were calcined at 500° C. for 9 hours. The amount of product recovered after calcination was 31.70 gr.

Figure 3:
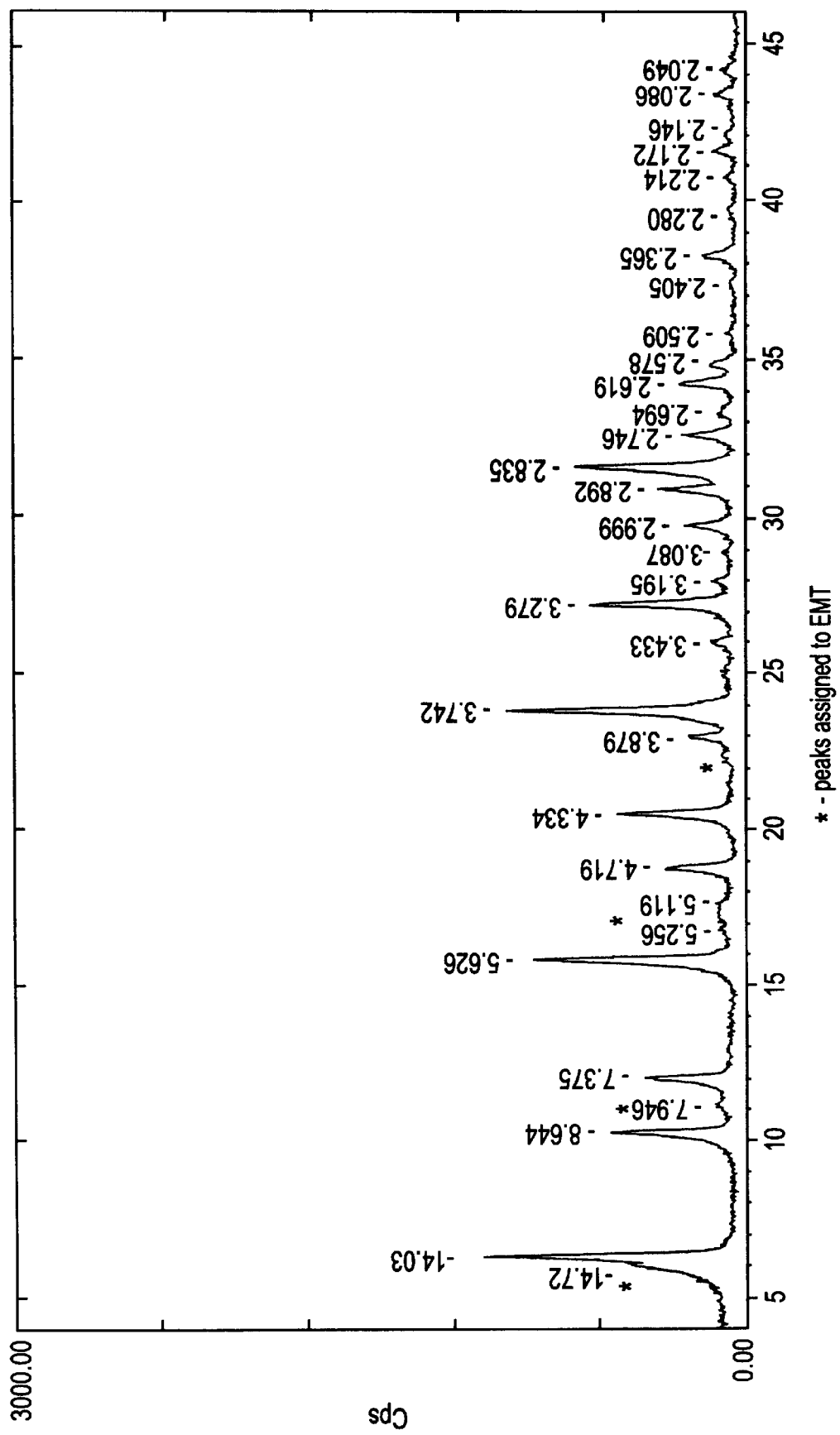
FIG. 3 is a x-ray diffractogram of the calcined product of Example 2.
Figure 4:
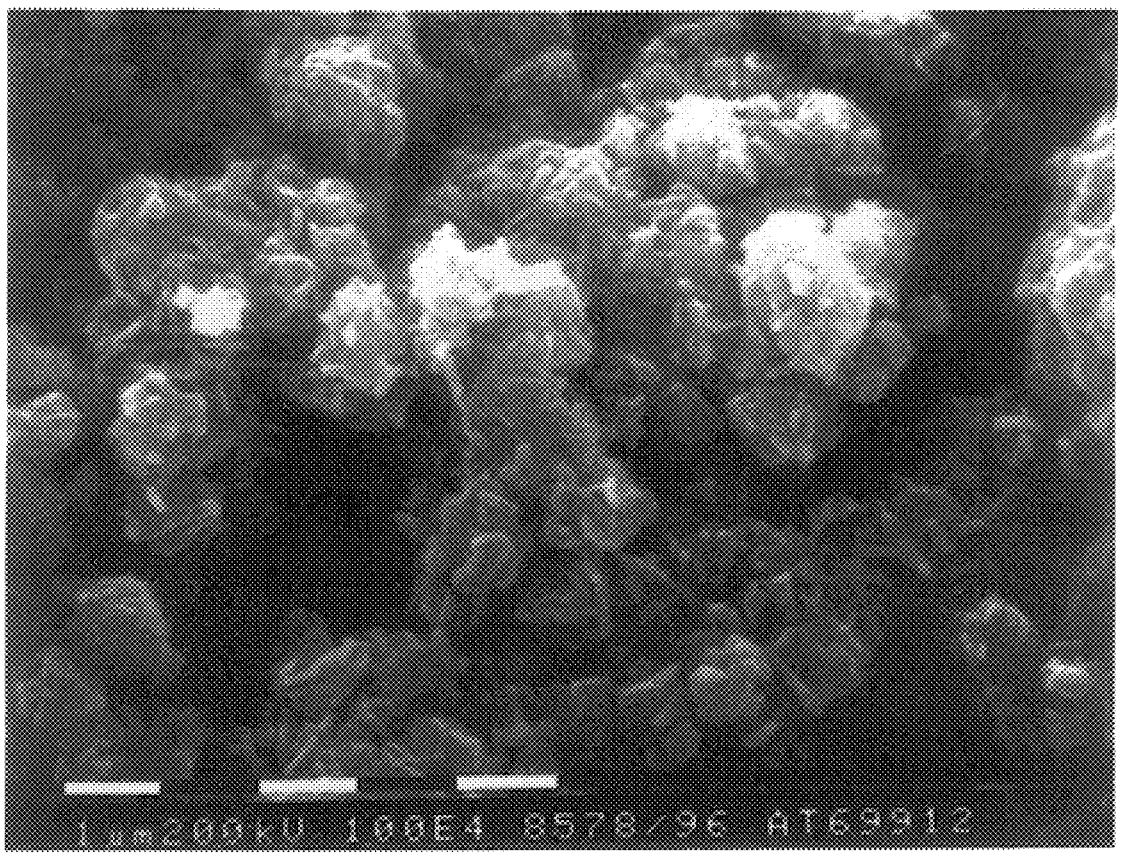
FIG. 4 is a SEM micrograph (10,000 times magnification) of the calcined product of Example 2.

The product extrudates were characterized by x-ray diffraction (XRD), scanning electron microscopy (SEM) and hexane adsorption with the following results:

| | |
|---|---|
| XRD | FIG. 3 shows that EMT structure type zeolite was formed. The product had excellent crystallinity. No amorphous halo was visible which would have indicated the presence of unconverted silica. Neither zeolite P or other crystalline phases were present. |
| SEM | FIG. 4 shows that the core crystals were coated and glued with platelet-like crystallites which morphology is typical of EMT structure type zeolite. |
| TCA | Hexane adsorption = 14.7 wt. % |

EXAMPLE 3

Preparation of Zeolite X Bound by Zeolite Y using 15-crown-5 Silica-bound zeolite X (SiO$_2$:Al$_2$O$_3$=2.5) extrudates were prepared using a procedure similar as described in Example 1. The silica content of the extrudates was 30.1 wt. %.

A portion of the silica-bound zeolite X extrudates were converted into zeolite X bound by zeolite Y as follows:

| Ingredient | Supplier | Quantity, gr. | Component No. |
|---|---|---|---|
| NaOH (98.6%) | Baker | 2.81 | 1 |
| Al(OH)$_3$ (98.5%) | AlCOA | 2.37 | 2 |
| H$_2$O | | 8.07 | 3 |
| Rinse water | | 14.27 | 4 |
| 15-crown-5 | Aldrich | 2.63 | 5 |
| H$_2$O | | 17.16 | 6 |
| Additional H$_2$O | | 8.70 | 7 |
| Silica bound zeolite X | | 30.58 | 8 |

Components 1 and 2 were dissolved into component 3 by boiling to form a solution. In a 100 ml. plastic bottle, component 5 was dissolved into component 6. Component 7 was added to the contents of the plastic bottle. The solution, which contained components 1, 2, and 3, was added together with component 4 into the plastic bottle. The bottle was mixed to ensure a homogeneous mixture. Finally component 8 was then added to the bottle. The molar composition of the synthesis mixture was:

2.31Na$_2$O/0.79C.E. 15-5/Al$_2$O$_3$/10SiO$_2$/186H$_2$O

The plastic bottle was connected to a condenser and placed into a 98° C. oil bath. After 7 days of heating at that temperature, crystallization was stopped. The product extrudates were washed 5 times with 1400 ml of water at 60° C. The conductivity of the last wash water was 47 µS/cm. The product was dried overnight at 120° C. Next, the extrudates were calcined at 500° C. for 9 hours. The amount of product recovered after calcination was 29.9 gr.

The product extrudates were characterized by x-ray diffraction (XRD), scanning electron microscopy (SEM) and hexane adsorption with the following results:

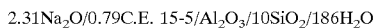

Figure 5:
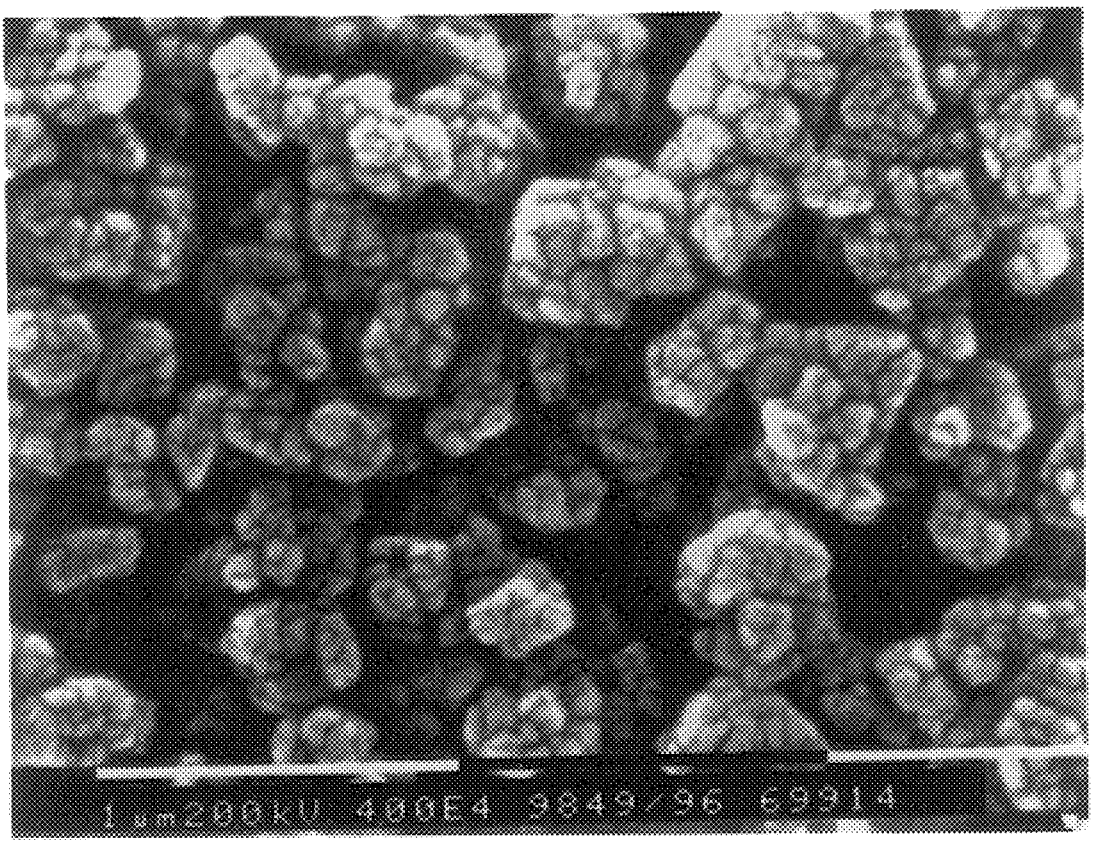
FIG. 5 is a SEM micrograph (40,000 times magnification) of the calcined product of Example 3.

| | |
|---|---|
| XRD | Excellent crystallinity. No zeolite P or other contaminants were present. |
| SEM | FIG. 5 shows that the zeolite X core crystals were coated and glued together with crystallites. |
| TGA | Hexane adsorption = 17.2 wt. % |
| Strength | Excellent physical strength |

EXAMPLE 4

Preparation of FAU bound zeolite Y without crown ether.

Figure 6:
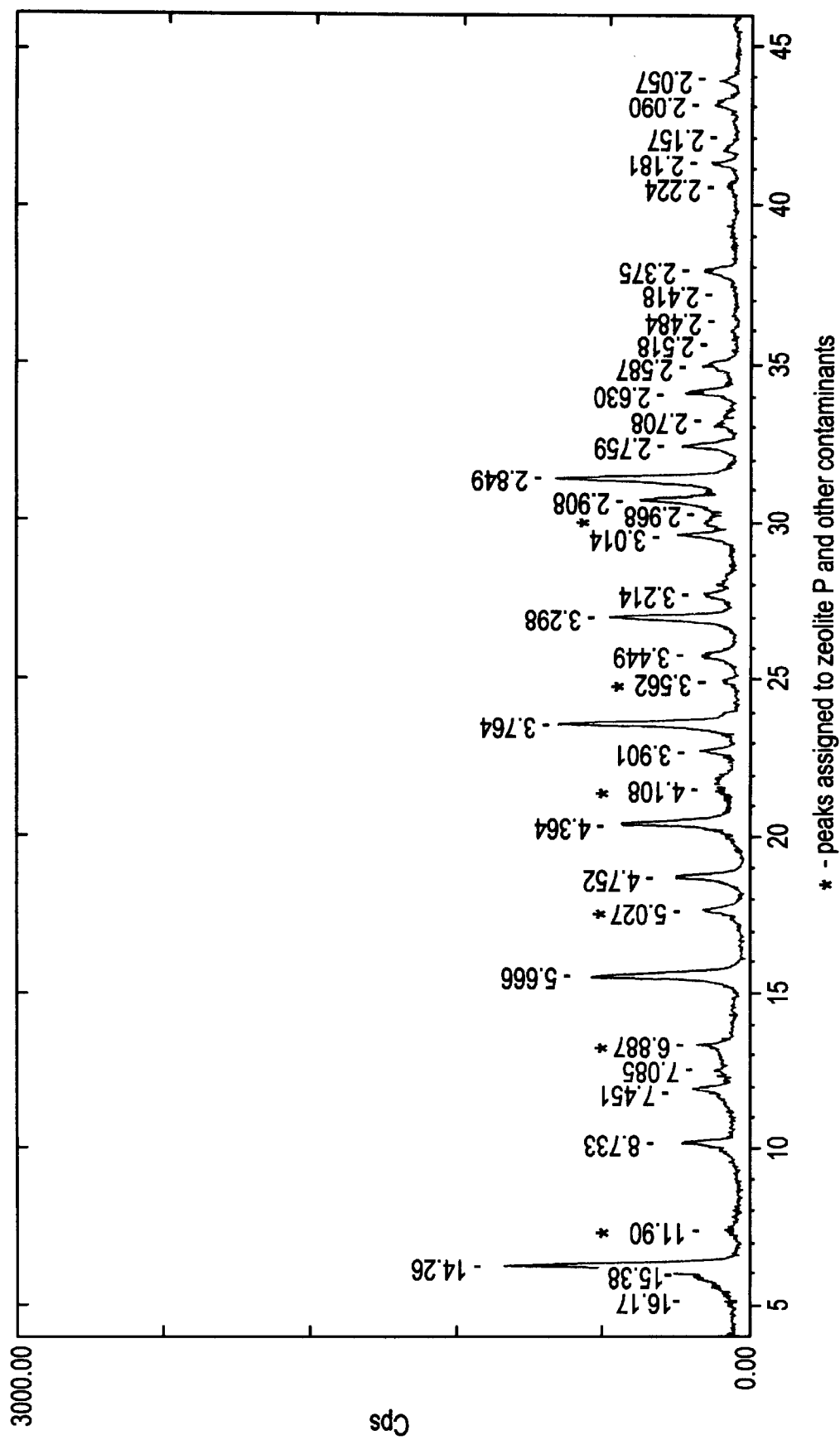
FIG. 6 is a x-ray diffractogram of the calcined product of Example 4.

A portion of silica-bound Y extrudates of Example 1 were converted to FAU-bound zeolite Y using a synthesis mixture with a molar composition of 3.25 Na$_2$O/Al$_2$O$_3$/10 SiO$_2$/185 H$_2$O. The mixture did not contain any crown ether. The alkalinity of the synthesis mixture was higher than for the synthesis mixture of Example 1 (Na$_2$O/SiO$_2$=0.325 vs. Na$_2$O/SiO$_2$=0.234 for Example 1) because without the presence of a crown ether in a low alkalinity synthesis mixture, the silica binder will not convert to a zeolite binder. The extrudates were aged for 65 hours in an oilbath at 98° C. The resulting extrudates had significantly less mechanical strength than the calcined products of Examples 1, 2, and 3. The x-ray diffraction shown in FIG. 6 indicates excellent crystallinity, but the product was contaminated with zeolite P and traces of other phases.

What is claimed is:

1. A process for preparing zeolite-bound FAU structure type zeolite containing reduced amounts of zeolite P, said process comprising:

converting a silica-bound aggregate containing FAU structure type zeolite in an aqueous alkaline mixture comprising an effective amount of crown ether and sufficient hydroxy ions to cause the silica binder to be converted to a zeolite binder.

2. The process recited in claim 1 wherein said crown ether is represented by the following formula:

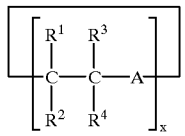

wherein:

A is selected from the group consisting of —O—, —S—, —NH—, —NR—, and —SiR$_2$—;

R is an alkyl group having from 1 to about 5 carbon atoms;

R$^1$, R$^2$, R$^3$, and R$^4$ are each independently selected from the group consisting of hydrogen and alkyl groups containing from 1 to about 10 carbon atoms or R$^1$, R$^2$, R$^3$, and R$^4$ together form substituted or unsubstituted cycloalkyl, aryl, aralkyl, or alkaryl groups; and x is an integer of at least about 4.

3. The process recited in claim 2 wherein A is oxygen.

4. The process recited in claim 3 wherein R$^1$, R$^2$, R$^3$, and R$^4$ are hydrogen.

5. The process recited in claim 4 wherein the zeolite of the binder has a FAU or EMT structure type.

6. The process recited in claim 5 wherein x is an integer from about 5 to about 10.

7. The process recited in claim 6 wherein said crown ether is present in said aqueous mixture in molar ratio of crown ether to SiO$_2$ of from about 0.01 to about 2.00.

8. The process recited in claim 7 wherein said hydroxy ions are present in said aqueous alkaline mixture in a molar ratio of (OH):(SiO$_2$) is the range of from about 0.025 to about 0.64.

9. The process recited in claim 8 wherein the FAU structure type zeolite of said silica-bound aggregate is a zeolite selected from the group consisting of faujasite, zeolite X, zeolite Y, SAPO-37, ZSM-3, and ZSM-20.

10. The process recited in claim 9 wherein the binder zeolite is a zeolite selected from the group consisting of EMC-2, faujasite, zeolite X, zeolite Y, SAPO-37, ECR-30, ZSM-3, and ZSM-20.

11. The process recited in claim 10 wherein the binder crystals have an average particle size that is less than the crystals of said FAU structure type zeolite.

12. The process recited in claim 11 wherein said zeolite-bound FAU structure type zeolite does not contain significant amounts of non-zeolitic binder.

13. The process recited in claim 8 wherein said process is carried out by the following steps:

(a) forming silica-bound aggregates comprising FAU structure type zeolite;

(b) introducing an effective amount of crown ether to suppress the formation of zeolite P into an aqueous ionic solution containing the silica-bound zeolite aggregates and sufficient hydroxy ions to cause the silica binder to be converted to the zeolite binder crystals; and, (c) converting the silica binder of said silica-bound aggregate to the zeolite binder.

14. The process recited in claim 12 wherein the crystals of said zeolite binder are intergrown and form at least a partial coating on the FAU structure type zeolite crystals.

15. The process cited in claim 14 wherein the crystals of said FAU structure type zeolite of the aggregate have an average particle size of from about 1 to about 15 microns and the crystals of the binder have an average particle size of from about 0.1 to about 0.5 micron.

16. The process recited in claim 8 wherein FAU structure type zeolite and said binder zeolite are an aluminosilicate, titanosilicate, borosilicate, or a gallosilicate.

17. The process recited in claim 12 wherein said crown ether is 12-crown-4, 15-crown-5, 18-crown-6, dibenzo-18-crown-6, dicyclohexano-18-crown-6, benzo-15-crown-5, or mixtures thereof.

18. The process recited in claim 17 wherein the FAU structure type of the aggregate is zeolite X or zeolite Y.

19. A process for preparing zeolite-bound FAU structure type zeolite containing reduced amounts of zeolite P, said process comprising:

converting a silica-bound aggregate containing FAU structure type zeolite selected from the group of zeolite X or zeolite Y in an aqueous alkaline mixture comprising a crown ether selected from the group of 12-crown-4, 15-crown-5, 18-crown-6, dibenzo-18-crown-6, dicyclohexano-18-crown-6, benzo-15-crown-5, or mixtures thereof and hydroxy ions to cause the silica binder to be converted to a zeolite binder, in said aqueous mixture said crown ether is present in a molar ratio of crown ether to SiO$_2$ of from about 0.01 to about 2.00 and said hydroxy ions are present in a molar ratio of (OH):(SiO$_2$) of from about 0.025 to about 0.64, said binder zeolite is zeolite X, zeolite Y, or faujasite and the binder crystals have an average particle size that is less than the crystals of said FAU structure type zeolite, and said zeolite-bound FAU structure type zeolite does not contain significant amounts of non-zeolite binder.

20. The process recited in claim 19 wherein said zeolite binder is substantially free of zeolite P.

21. The process recited in claim 19 wherein said hydroxy ions are present in said aqueous alkaline mixture in a molar ratio of (OH$^{-31}$):(SiO$_2$) is the range of from about 0.10 to about 0.55.

22. The process recited in claim 21 wherein said crown ether is present in said aqueous mixture in molar ratio of crown ether to SiO$_2$ of from about 0.01 to about 1.00.

23. The process cited in claim 22 wherein said zeolite-bound FAU structure type contains less than 5 percent by weight of non-zeolitic binder based on the weight of said FAU structure type zeolite and zeolite binder.

24. The process recited in claim 13 wherein said conversion is carried out at a temperature for about 95 to about 200° C.

25. The process recited in claim 24 wherein said conversion is carried out from about 18 to about 40 hours.

26. The process recited in claim 12 wherein said zeolite-bound FAU structure type zeolite further comprises a catalytically active metal.

27. The process recited in claim 18 wherein said crown ether is 15-crown-5 and the FAU structure type is zeolite Y.

28. The process recited in claim 19 wherein said crown ether is 18-crown-6.

29. A process for converting hydrocarbons comprising contacting a hydrocarbon feedstream under hydrocarbon conversion conditions with a zeolite-bound FAU structure type zeolite catalyst said catalyst prepared by a process which comprises:
converting a silica-bound aggregate containing FAU structure type zeolite in an aqueous alkaline mixture comprising an effective amount of crown ether and sufficient hydroxy ions to cause the silica binder to be converted to a zeolite binder.

30. The process recited in claim 29 wherein said crown ether is represented by the following formula:

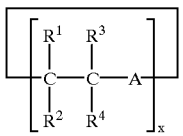

wherein:
A is selected from the group consisting of —O—, —S—, —NH—, —NR—, and —SiR$_2$—;
R is an alkyl group having from 1 to about 5 carbon atoms;
$R^1$, $R^2$, $R^3$, and $R^4$ are each independently selected from the group consisting of hydrogen and alkyl groups containing from 1 to about 10 carbon atoms or $R^1$, $R^2$, $R^3$, and $R^4$ together form substituted or unsubstituted cycloalkyl, aryl, aralkyl, or alkaryl groups; and
x is an integer of at least about 4.

31. The process recited in claim 30 wherein A is oxygen, $R^1$, $R^2$, $R^3$, and $R^4$ are hydrogen and x is an integer from about 5 to about 10.

32. The process recited in claim 31 wherein the zeolite of the binder has a FAU or EMT structure type.

33. The process recited in claim 32 wherein said crown ether is present in said aqueous mixture in molar ratio of crown ether to SiO$_2$ of from about 0.01 to about 2.00.

34. The process recited in claim 33 wherein said hydroxy ions are present in said aqueous alkaline mixture in a molar ratio of (OH):(SiO$_2$) is the range of from about 0.025 to about 0.64.

35. The process recited in claim 34 wherein the FAU structure type zeolite of said silica-bound aggregate is a zeolite selected from the group consisting of faujazite, zeolite X, zeolite Y, SAPO-37, ECR-30, ZSM-3, and ZSM-20.

36. The process recited in claim 35 wherein the binder zeolite is a zeolite selected from the group consisting of EMC-2, faujasite, zeolite X, zeolite Y, SAPO-37, ECR-30, ZSM-20, and ZSM-3.

37. The process recited in claim 36 wherein the binder crystals have an average particle size that is less than the crystals of said FAU structure type zeolite of the silica bound aggregate.

38. The process recited in claim 37 wherein the crystals of said zeolite binder are intergrown and form at least a partial coating on the FAU structure type zeolite crystals.

39. The process recited in claim 38 wherein said hydrocarbon conversion is carried out at conditions comprising a temperature of from 100° C. to about 760° C., a pressure of 0.1 atmosphere to 100 atmospheres, a weight hourly space velocity of from about 0.08 hr$^{-1}$ to about 200 hr$^1$.

40. The process recited in claim 39 wherein said hydrocarbon conversion is selected from the group consisting of the cracking of hydrocracking, the reforming of naphtha to aromatics, and the dewaxing of hydrocarbons.

41. The process recited in claim 40 wherein said zeolite-bound FAU structure type zeolite does not contain significant amounts of non-zeolitic binder.

42. The process cited in claim 41 wherein the crystals of said FAU structure type zeolite of the aggregate have an average particle size of from about 1 to about 15 microns and the crystals of the binder have an average particle size of from about 0.1 to about 0.5 micron.

43. The process recited in claim 42 wherein FAU structure type zeolite and said binder zeolite are an aluminosilicate, titanosilicate, borosilicate, or a gallosilicate.

44. The process recited in claim 42 wherein said crown ether is 12-crown-4, 15-crown-5, 18-crown-6 dibenzo-18-crown-6, dicyclohexano-18-crown-6, benzo-15-crown-5, or mixtures thereof.

45. The process recited in claim 44 wherein the FAU structure type of the aggregate is zeolite X or zeolite Y.

46. A process for converting hydrocarbons comprising contacting a hydrocarbon feedstream under hydrocarbon conversion conditions with a zeolite-bound FAU structure type zeolite containing reduced amounts of zeolite P, said catalyst prepared by a process which comprises:
converting a silica-bound aggregate containing FAU structure type zeolite selected from the group of zeolite X or zeolite Y in an aqueous alkaline mixture comprising a crown ether selected from the group of 12-crown-4, 15-crown-5, 18-crown-6, dibenzo-18-crown-6, dicyclohexano-18-crown-6, benzo-15-crown-5, or mixtures thereof and hydroxy ions to cause the silica binder to be converted to a zeolite binder, said crown ether is present in said aqueous mixture in a molar ratio of crown ether to SiO$_2$ of from about 0.01 to about 2.00, said hydroxy ions are present in said aqueous mixture in molar ratio of (OH):(SiO$_2$) of from about 0.025 to about 0.64, said binder zeolite is zeolite X, zeolite Y, or fuiajasite and the binder crystals have an average particle size of from about 0.1 to about 0.5 micron and are intergrown and form at least a partial coating on the FAU structure type zeolite crystals, said FAU structure type zeolite have an average particle size of from about 1 to about 15 micron and said zeolite-bound FAU structure type zeolite does not contain significant amounts of non-zeolite binder.

47. The process recited in claim 46 wherein said zeolite binder is substantially free of zeolite P.

48. The process recited in claim 45 wherein said crown ether is 15-crown-5 and the zeolite binder is zeolite Y.

49. The process recited in claim 45 wherein said crown ether is 18-crown-6 and the zeolite binder has an EMT structure type.

50. The process recited in claim 41 wherein said zeolite-bound FAU structure type zeolite further comprises a catalytically active metal.

51. A process for the selectively separating a hydrocarbon having a critical dimension less than the pore size of FAU structure type zeolite in admixture with hydrocarbons which process comprises contacting the mixture with the zeolite-bound FAU structure type zeolite prepared by the process of claim 19.

52. A process recited in claim 51 wherein said selective separation is the selective separation of paraxylene from a feed containing C$_8$ aromatic isomers containing paraxylene.

53. A zeolite-bound zeolite catalyst which does not contain significant amounts of non-zeolitic binder and comprises:
(a) first crystals of a first zeolite having a FAU structure type; and (b) a zeolite binder substantially free of zeolite P as evidenced by an absence of the XRD pattern of a line at the d spacing of 3.18±0.1 Å and comprising second crystals of a second zeolite having an EMT or FAU structure type.

54. The catalyst recited in claim 53 wherein the first crystals have an average particle size greater than 0.1 micron and the second crystals have an average particle size less than that of the first crystals.

55. The catalyst recited in claim 54 wherein the FAU structure type zeolite of said silica-bound aggregate is a zeolite selected from the group consisting of faujasite, zeolite X zeolite Y, ZSM-3, and ZSM-20.

56. The catalyst recited in claim 55 wherein the binder zeolite is a zeolite selected from the group consisting of EMC-2, faujasite, zeolite X, zeolite Y, SAPO-37, ECR-30, ZSM-20, and ZSM-3.

57. The catalyst recited in claim 56 wherein the second crystals are intergrown and form at least a partial coating on the first crystals.

58. The catalyst recited in claim 57 wherein the first zeolite is zeolite X or zeolite Y.

59. The catalyst recited in claim 58 wherein the binder zeolite is zeolite X, zeolite Y, or FAU structure type zeolite.

60. The catalyst recited in claim 59 which contains less than 5% by weight of non-zeolitic binder based on the combined weight of the first zeolite and the second zeolite.

61. The catalyst recited in claim 60 wherein the average particle size of the first crystals is from 1 to 6 microns and the average particle size of the second crystals is from 0.1 to 0.5 microns.

62. The catalyst recited in claim 61 wherein the first zeolite and/or the second zeolite are aluminosilicate, titanosilicate, or gallosilicate.

* * * * *